United States Patent [19]

Hara et al.

[11] Patent Number: 5,557,983
[45] Date of Patent: *Sep. 24, 1996

[54] DEVICE FOR MOVING CAM RELATIVE TO ITS DRIVING SHAFT

[75] Inventors: Seinosuke Hara; Yosihiko Yamada, both of Atsugi, Japan

[73] Assignee: Unisia Jecs Corporation, Atsugi, Japan

[*] Notice: The term of this patent shall not extend beyond the expiration date of Pat. No. 5,365,896.

[21] Appl. No.: 77,509

[22] Filed: Jun. 17, 1993

[30] Foreign Application Priority Data

Jun. 17, 1992 [JP] Japan .................................... 4-157911

[51] Int. Cl.$^6$ ...................................................... F01L 1/34
[52] U.S. Cl. ........................ 74/568 R; 74/409; 123/90.17; 123/90.31
[58] Field of Search ................... 74/568 R, 409; 123/90.17, 90.31

[56] References Cited

U.S. PATENT DOCUMENTS

| 2,440,901 | 5/1948 | Larson | 74/409 |
| 3,633,555 | 11/1972 | Raggi | 123/90.17 |
| 5,333,579 | 8/1994 | Hara et al. | 74/568 R X |
| 5,365,896 | 11/1994 | Hara et al. | 123/90.17 |

FOREIGN PATENT DOCUMENTS

| 4302246 | 7/1993 | Germany . |
| 57-198306 | 12/1982 | Japan . |
| 1311562 | 3/1973 | United Kingdom . |
| 2165885 | 4/1986 | United Kingdom . |
| 2263529 | 7/1993 | United Kingdom . |

Primary Examiner—Richard M. Lorence
Attorney, Agent, or Firm—Foley & Lardner

[57] ABSTRACT

A device is proposed which enables a cam controlling an internal combustion engine valve to be moved relative to its driving shaft. A drive member is rotatable with a driving shaft, and a cam for co-axial rotation relative to the driving shaft. An intermediate member is mounted in a support for rotation so as to rotate eccentrically with respect to an axis of the driving shaft. The support is held for movement within a plane perpendicular to the shaft axis. A control rod is drivingly associated with the support and driven by an actuator.

14 Claims, 6 Drawing Sheets

5,557,983

DEVICE FOR MOVING CAM RELATIVE TO ITS DRIVING SHAFT

RELATED COPENDING APPLICATIONS

U.S. patent application Ser. No. 08/008,801 (now U.S. Pat. No. 5,333,579), filed Jan. 27, 1993 by Seinosuke HARA et al., entitled "CONTROL DEVICE FOR CONTROLLING INTAKE AND EXHAUST VALVES OF INTERNAL COMBUSTION ENGINE"

British Patent Application No. 9301590.7

German Patent Application No. P 4302246.4

BACKGROUND OF THE INVENTION

The present invention relates to a cam shaft assembly for use in an internal combustion engine to control the opening and closing of intake and/or exhaust valves.

GB-A 1 311 562 discloses a device for moving a cam relative to its driving shaft. This device is applicable to an internal combustion engine to vary the movement of the cams which control the intake and/or exhaust valves of the engine. This known device comprises a drive member rotatable with a driving shaft, and an intermediate member mounted in an external bearing which is eccentric with respect to the shaft. The shaft extends through an opening in the intermediate member dimensioned to allow limited movement of the bearing to vary the eccentricity. A cam is coaxial with the shaft and rotatable relative thereto. The device includes a first coupling between the drive member and the intermediate member at a first positive spaced from the shaft axis, and a second coupling between the intermediate member and the cam at a second position angularly spaced from the first position with respect to the shaft axis. The two couplings are so spaced from the shaft axis that they are at varying distances from the axis of the intermediate member during operation. Each of these couplings has a movable connection with the intermediate member to permit the variation in its distance from the axis of the intermediate member.

SUMMARY OF THE INVENTION

An object of the present invention is to improve the above mentioned mechanism such that a support forming a bearing rotatably supporting an intermediate member can continuously vary the eccentricity.

According to the present invention, there is provided a device for moving a cam relative to its driving shaft, the device comprising:

a driving shaft rotatable about a shaft axis;

a drive member rotatable with said driving shaft;

a cam rotatable about said shaft axis, relative to said driving shaft;

a support;

an intermediate member supported in said support for rotation so as to rotate eccentrically with respect to said shaft axis;

a first coupling between said drive member and from intermediate member at a first position spaced from said shaft axis; and a second coupling between said intermediate member and said hollow cam at a second position angularly spaced from said first position with respect to said shaft axis, said first and second couplings being so spaced from said shaft axis that they are at varying distances from the axis of said intermediate member during operation, each of said first and second couplings having a movable connection with said intermediate member to permit the variation in its distance from said axis of said intermediate member, wherein said support is hold for movement within a plane perpendicular to said shaft axis and said support is driven to take different positions continuously to produce different values in the eccentricity of said intermediate member.

DESCRIPTION OF THE EMBODIMENTS

A first embodiment of a device according to the present invention is described in connection with FIGS. 1 through 7.

Basically, the device comprises a drive member, in the form of a drive collar, rotatable with a driving shaft. The drive collar is formed with a radial slot. An intermediate member, in the form of an annular disc, has a pin projecting from its one face into the radial slot of the drive collar. The annular disc is fitted around the driving shaft with ample radial clearance, and has another pin projecting from its opposite face into a radial slot cut in a driven collar, forming an integral part of a cam whose movement is being controlled. The cam is mounted on the drive shaft for rotation relative thereto. The disc is supported in a bearing of a support or a disc housing which itself can be moved to vary the eccentricity of the disc with respect to the driving shaft. By reason of the differing positions in which this disc can be placed within the plane of rotation, and thus by reason of the different positions of the radial slot of the drive collar engaged by the pin of the disc and the radial slot of the driven collar engaged by the pin of the disc, the angular velocities imparted to the cam at different rotational positions can be varied.

The mechanisms will now be considered in more detail.

Figure 3:
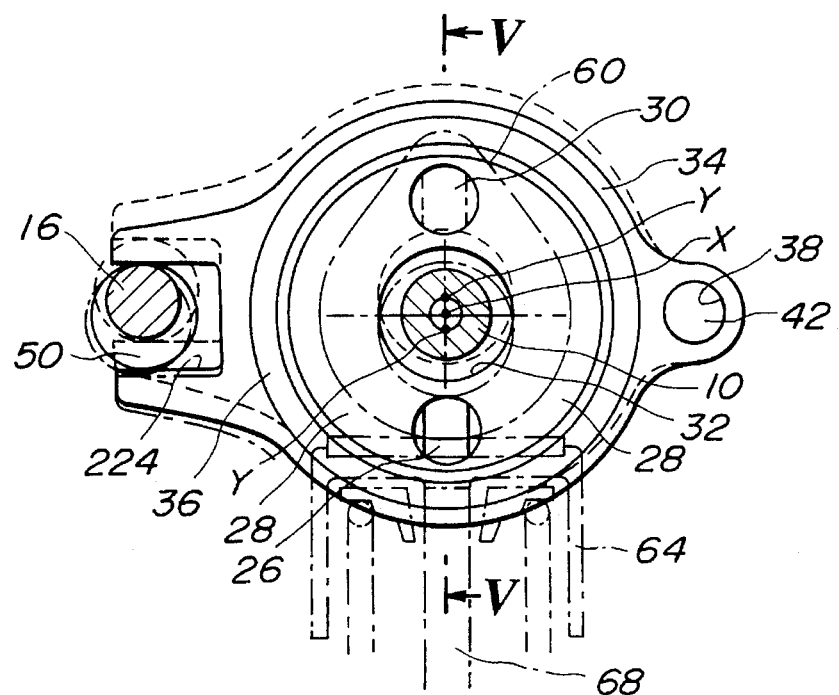
FIG. 3 is a cross section, taken through the line III—III in FIG. 5.
Figure 4:
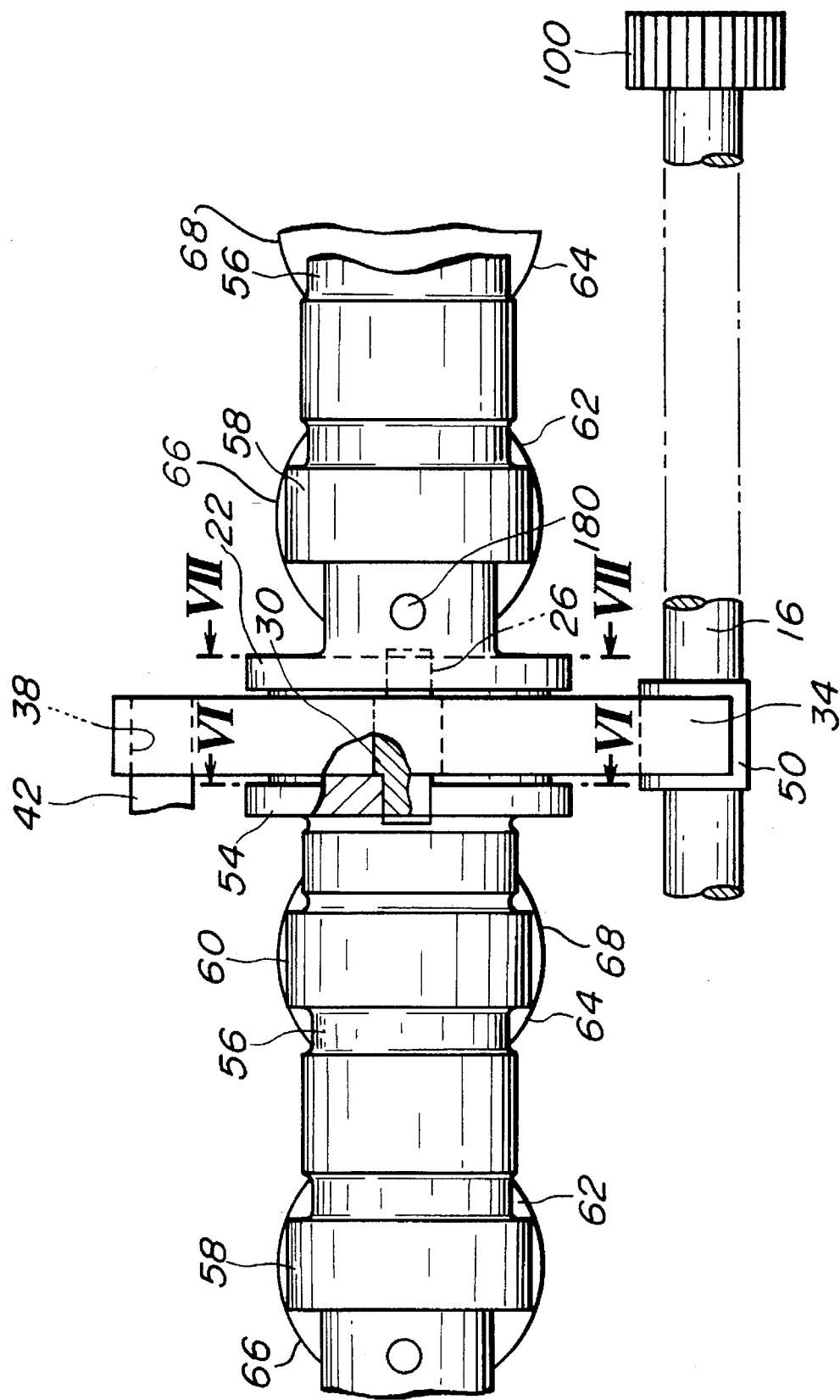
FIG. 4 is a plan view of the device shown in FIG. 5.
Figure 5:
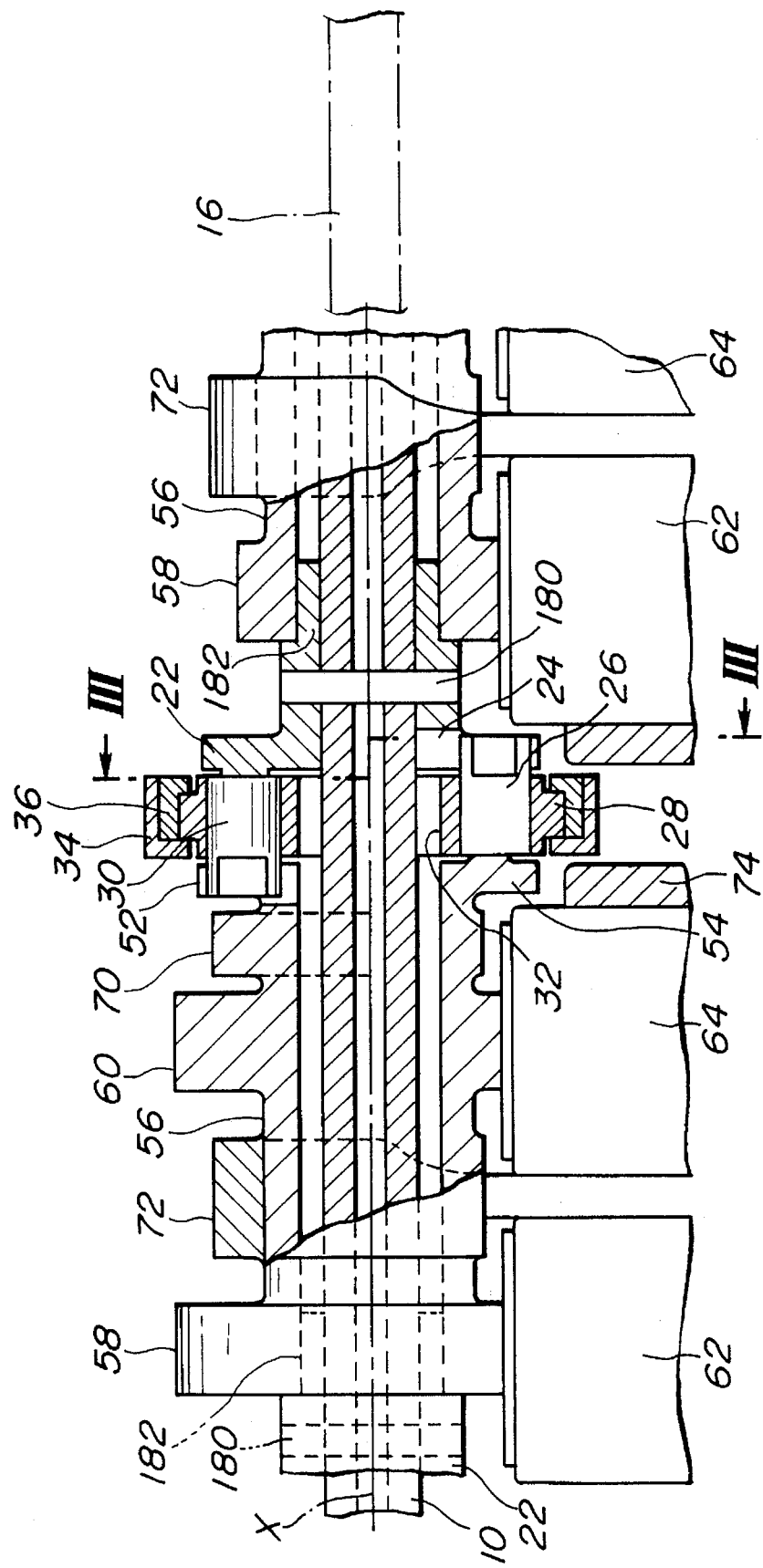
FIG. 5 is a longitudinal section taken through the line V—V in FIG. 3.
Figure 6:
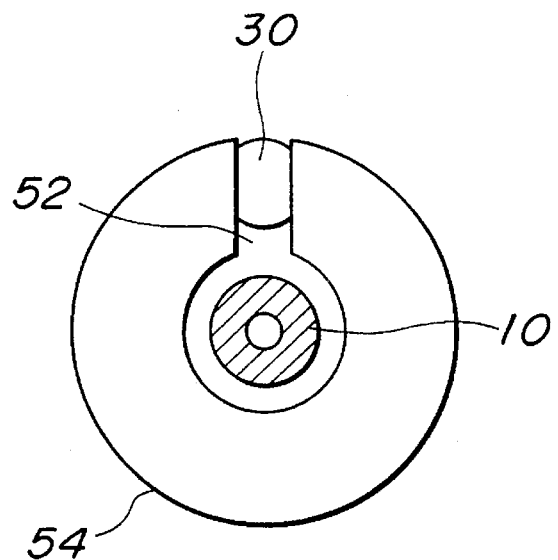
FIG. 6 is a section taken through the line VI—VI in FIG. 4.
Figure 7:
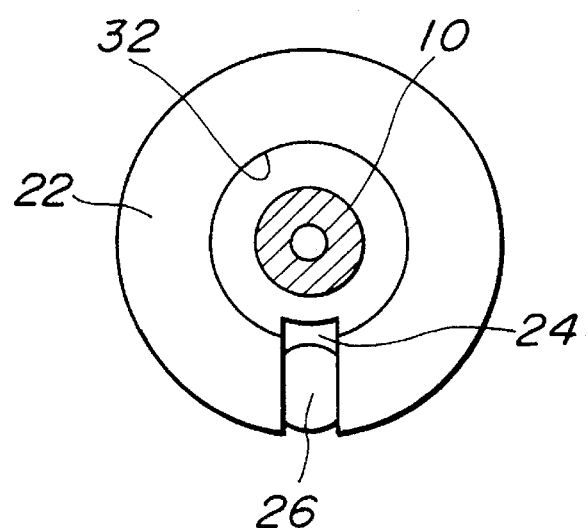
FIG. 7 is a section taken through the line VII—VII in FIG. 4.

In FIGS. 3, 4 and 5, the mechanism is applied to one double cam with two cam lobes which control tappets of two intake valves for the corresponding one of cylinders of an internal combustion engine.

A driving shaft 10 which drives all the cams, is rotatable by conventional means such as a toothed wheel and a chain. The cams are not integral with the shaft 10, but rotatable relative to the shaft 10. Their movement is restricted in a longitudinal direction.

Figure 2:
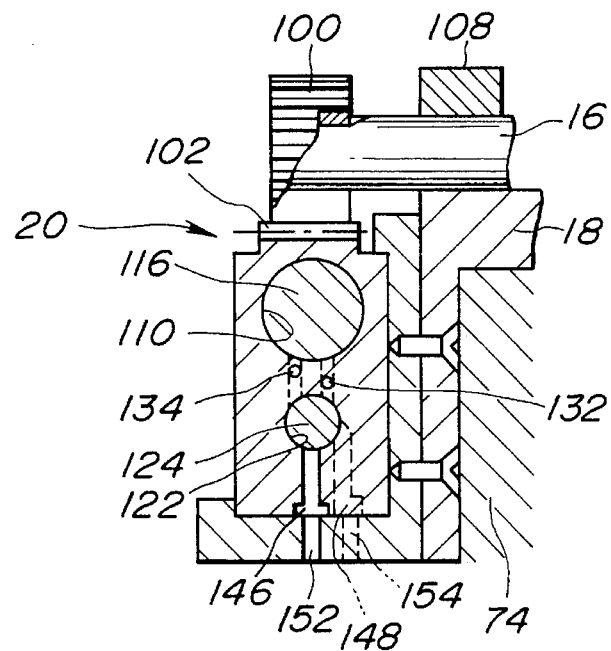
FIG. 2 is a cross section taken through the line II—II in FIG. 1.

A control rod 16, with integral eccentric control cams which moves all of the disc housings, to vary the eccentricity of the annular discs, is rotatably supported in grooves cut into tops of beams of a suitable structure and held by a plurality of bearing caps, only one being shown at 108 in FIG. 2. In FIG. 2, the bearing cap 108 cooperates with a bracket 18 rigidly secured to the engine cylinder head 74. The control rod 16 is rotatable by an actuator 20 rigidly attached to the bracket 18.

A drive collar 22 is mounted coaxially with the shaft 10 for rotation therewith by means of a collar pin 180 and a has a sleeve 182 rotatably received by the adjacent cam 56. A radial slot 24 of the drive collar 22 is slidably engaged by a first pin 26 of an annular disc or intermediate member 28. The pin 26 is rotatably supported by the disc 28 and projects from one face of the disc 28 into the radial slot 24. Projecting from the opposite face of the disc 28 is a second pin 30 which is symmetrical to and preferably at an angle of 180° to the first pin 26.

The central hole 32 of the disc 28 is wide and the disc 28 does not touch the surface of the driving shaft 10, but is free to move into positions eccentric with respect to the driving shaft 10. A disc housing or support 34 forms a bearing 36 which supports the disc 28 for rotation. The disc housing 34 is movable to move the disc 28 in a plane perpendicular to the axis X of the shaft 10. The disc housing 34 has a hole 38 which rotatably receives a pivot shaft 42 such that the disc housing 34 can tilt about the pivot shaft axis. The disc housing 34 has a slot 224 (see FIG. 3) which is slidably engaged by an eccentric control cam 50. This eccentric control cam 50 forms an integral part of the control rod 16. This slot 224 allows smooth tilting of the disc housing 34 about the pivot shaft 42 induced by eccentric motion of the eccentric control cam 50.

The second pin 30 is rotatably supported by the disc 28 and can slide along a radial slot 52 in a driven collar 54, forming an integral part and thus rotatable with a cam 56. The cam 56 is freely rotatable on the shaft 10, but cannot slide in a longitudinal direction. The cam 56 has two cam lobes 58 and 60 which controls tappets 62 and 64 of two intake valves 66 and 68 for one cylinder.

The cam 56 is supported through two cam brackets 70 and 72, by the engine cylinder head 74.

During operation of the engine, the driving shaft 10 is rotated about its axis by the toothed wheel and chain. The shaft 10 rotates the drive collar 22. The radial slot 24 is engaged by the pin 26 projecting from the disc 28 and rotates the disc 28. Through the pin 30 and the radial slot 52, the disc 28 rotates the cam 56 which controls the tappets 62 and 64 of the intake valves 66 and 68. If the axis X of the shaft 10 coincides with the axis Y of the disc 28, whose position can be varied by angular displacement of the control rod 16, there is no difference in angular velocity of the shaft 10 and the cam 56. The pin 30 of the disc 28, therefore, causes the radial slot 52 of the cam 56 to rotate at the same angular velocity as the shaft 10.

Let us now suppose that the disc 28 in FIG. 5 is moved down, thus producing an eccentricity between the shaft 10 and the disc 28. If the shaft 10 rotates at a constant speed, the angular velocity of the disc 28 will no longer be equal to that of the shaft 10, but, in the angular position shown in FIG. 5, will be higher than that of the shaft 10. Obviously, by increasing the eccentricity, the difference in angular velocity between the disc 28 and the shaft 10 can be increased. In other words, the disc 28 is at the end of an acceleration phase which has increased its angular velocity to a value higher than the angular velocity of the shaft 10. This value is adjustable within predetermined limits by varying the magnitude of the eccentricity.

When the mechanism is rotated through 180°, the opposite situation occurs, i.e., the angular velocity of the disc 28 is lower than that of the shaft 10.

From the above, it is apparent that there will be a moment in between the two situations described in which the angular velocity of the disc 28 and the shaft 10 is equal. This moment will occur whenever the radial plane including the axis Y of the disc 28 and the pins 26 and 30 is approximately perpendicular to the plane of the drawing FIG. 5.

It is evident that if the shaft 10 and the drive collar 22 rotate at the same speed, the disc 28 will accelerate or decelerate depending on the relative angular and instantaneous angular positions of the various interconnected components. In two relative angular positions, the disc 28 will rotate at a speed equal to that of the shaft 10, while its rotation speed will be higher or lower than that of the shaft 10 in intermediate angular positions.

These variations in relative speed are imparted by the transmission of motion of the disc 28 through the pin 30 and the radial slot 52 to the cam 56, with the result that the cam 56 has maximum and minimum instantaneous velocities.

With the mechanism, the uniform rotation of the driving shaft 10 can be used to make each cam 56 to rotate at different speeds, within the limits of the rotational speed of the shaft 10.

The degree of acceleration and deceleration can be adjusted continuously by varying the magnitude of eccentricity.

If now the disc housing 34 is tilted about an axis parallel to the axis of the driving shaft 10, then the phase angle of the eccentricity will be changed.

Therefore, the mechanism is characterized by the fact that the cams 56 can be moved at varying speeds, using the motion of the driving shaft 10 rotating at a constant speed. This speed variation can be regulated both in amplitude and in phase, and can also be inverted within predetermined limits by adjusting the magnitude and angular direction of eccentricity.

From the above, it is clear that the mechanism can alter the lift and fall times of the intake valves 66 and 68 by directly determining the speed at which the cams 56 rotate, and can modify the opening and closing phases of the valves 66 and 68 as well as law governing their motion.

Figure 1:
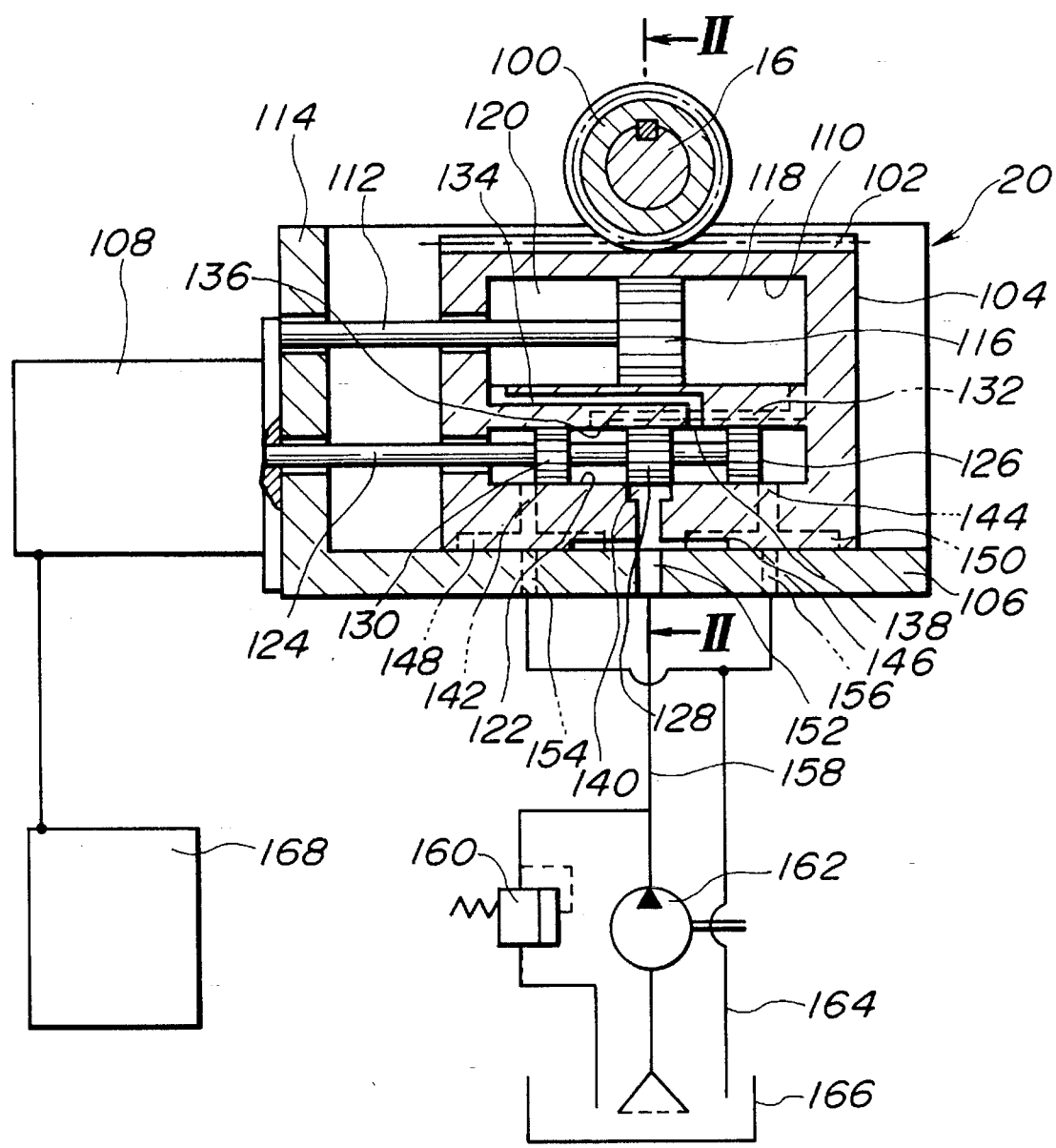
FIG. 1 is a section view of an actuator used in a first embodiment of a device according to the present invention.

Referring to FIGS. 1 and 2, the actuator 20 of the hydraulic type is described. A pinion 100 is coupled with the control rod 16 for rotation therewith. The pinion 100 is engaged by a rack 102 of a slider 104 of the actuator 20. The slider 104 is supported by a housing 106 for movement along a line perpendicular to the axis of the control rod 16. The actuator 20 includes a linear actuator 108 incorporating a stepper motor. Basically, the slider 104 can take any one of various positions between the two limits which are determined by the relative position of the slider 104 to the housing 106 in response to the linear actuator 108 owing to hydraulic means.

Describing the hydraulic means, the slider 104 is formed with a cylindrical bore 110. A piston rod 112 has a lefthand end, as viewed in FIG. 1, fixedly connected, by press fit, to an end wall 114 to which the linear actuator 108 is fixedly attached. The piston rod 112 projects axially into the cylindrical bore 110 and fixedly connected to a piston 116 within the cylindrical bore 110. The piston 116 divides the cylindrical bore 110 into two chambers, namely a first chamber 118 and a second chamber 120. The second chamber 120 is defined within the cylindrical bore 110 by the piston 116 and piston rod 112. The piston 116 can slide on the bore defining wall to allow telescopical motion between the slider 104 and the piston rod 112. The slider 104 has formed therein a spool bore 122 spaced in parallel from the piston bore 110. A spool 124 is supported by the end wall 114 of the housing 106 for longitudinal linear motion relative to the housing 106. The spool 124 is moved by the linear actuator 108 such that the spool 124 can assume any one of positions between the limits relative to the housing 106. In other words, the spool 124 can move to the left or right from the 124 projects into the bore 122 and has thereon three axially spaced lands, namely a first land 126, a second land 128 and a third land 130. The first and third lands 126 and 130 are no dimensioned as to provide a clearance between the first land 126 and the adjacent spool bore wall and a clearance between the third land 130 and the adjacent spool bore wall Such clearances, not illustrated, allow discharge flows of hydraulic fluid displaced out of the piston bore 110. The spool bore 122 is fluidly connected to the piston bore 10 via a first passage 132 and a second passage 134 which extend through the slider 104. The first passage 132 has one end communicating with a first outlet port 136 opening to the spool bore 122, and its opposite end always communicating with the first chamber 118 in the piston bore 110. The second passage 134 has one end communicating with a second outlet port 138 opening to the spool bore 122. The first and second outlet ports 136 and 138 are always uncovered and open to an annular space defined between the lands 128 and 130 and an annular space defined between the lands 138 and 126, respectively. The other ports opening to the spool bore 122 are an inlet port 140, a first discharge port 142 and a second discharge port 144. The inlet port 140 is so arranged as to communicate with the first and second outlet ports 136 and 138 selectively in response to the direction of displacement of the spool from a predetermined position as illustrated in FIG. 1 and the position of the spool 124 relative to the spool bore 122. In this predetermined position, the inlet port 140 is covered. The inlet port 140 communicates with an inlet groove 146 cut in the slider 104. The first discharge port 142 and second discharge port 144 communicate with first and second discharge grooves 148 and 150, respectively, which are cut in the slider 104. These three grooves 146, 148 and 150 extend in a direction of movement of the housing 106, however, has a fluid supply port 152 opening to the inlet groove 146, a first drain port 154 opening to the first discharge groove 148, and a second drain port 156 opening to the second discharge groove 150.

Communicating with the fluid supply port 152 is a fluid supply line 158 to which fluid under pressure regulated by a pressure regular 160 is supplied. The pressure regulator 160 is supplied with fluid discharged by a pump 162. The first and second drain ports 154 and 156 communicate with a drain line 164 leading to a drainage 166.

In response to the output of a control unit 168, the linear actuator 108 controls the spool 124. The control unit 168 receives signals indicative of engine speed and intake air flow rate in determining the output on which the linear actuator 108 operates.

The device functions as follows. During engine operation with low load, the linear actuator 108 moves the spool 124 to the rightward limit position as viewed in FIG. 1. This rightward movement of the spool 124 causes the initiation of supply of fluid to the first chamber 118 through the inlet port 140, first outlet port 136, and first passage 132 and the initiation of discharge of fluid from the second chamber 120 through the second passage 134, second outlet port 138, the clearance between the land 126 and the adjacent spool bore wall, and second discharge port 144. As a result, the slider 104 begins to move to the right viewing in FIG. 1. This rightward movement of the slider 104 causes a reduction in degree of opening of the inlet port 140. The slider 104 comes to a halt when the inlet port 140 comes to a position where it is covered again by the second land 128. During this rightward movement of the slider 104, the control rod 16 is turned counterclockwise as viewed in FIG. 1 owing to engagement of the rack 102 with the pinion 100. As a result, the eccentric control cam 50 takes a position as illustrated by a broken line in FIG. 3, holding the disc housing 34 at a position as illustrated by the broken line. In this position, the axis Y of the disc 28 deviates upwardly viewing in FIG. 3 from the axis X of the shaft 10, causing acceleration of the cam 56 when the cam lobes 58 and 60 lift the associated intake valves via tappets 62 and 64.

During engine operation at high speed with high load, the linear actuator 108 moves the spool 124 to the leftward limit position as viewed in FIG. 1. This leftward movement of the spool 124 causes the initiation of supply of fluid to the second chamber 120 through the inlet port 140, second outlet port 138, and second passage 134 and the initiation of discharge of fluid from the first chamber 118 through the first passage 132, first outlet port 136, the clearance between the land 130 and the adjacent spool bore wall, and first discharge port 142. As a result, the slider 104 begins to move to the left viewing in FIG. 1. This leftward movement of the slider 104 causes a reduction in degree of opening of the inlet port 140. The slider 104 comes to a halt when the inlet port 140 comes to a position where it is covered again by the second land 128. During this leftward movement of the slider 104, the control rod 16 is turned clockwise as viewed in FIG. 1. As a result, the eccentric control cam 50 takes a position as illustrated by the one-dot chain line in FIG. 3, holding the disc housing 34 at a position as illustrated by the one-dot chain line. In this position, the axis Y of the disc 28 deviates downwardly, viewing in FIG. 3 from the axis X of the shaft 10, causing deceleration of the cam 56 when the cam lobes 58 and 60 lift the associated intake valves via tappets 62 and 64.

The slider 104 can assume any desired position between the two limit positions discussed above. Thus, the degree of acceleration or deceleration of the cam 56 may be varied so as to meet varying demands.

Figure 8:
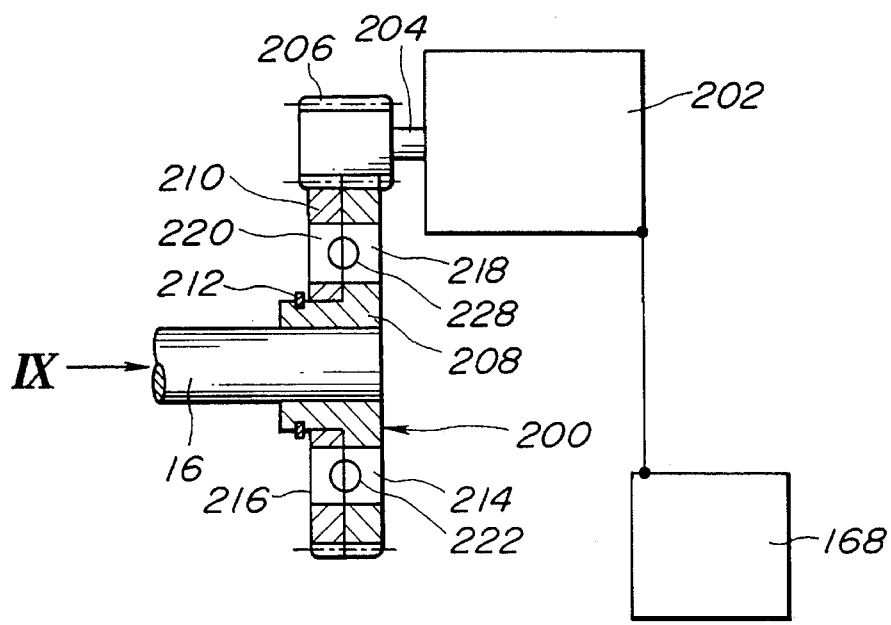
FIG. 8 is a sectional view of an actuator used in a second embodiment of the device according to the present invention.
Figure 9:
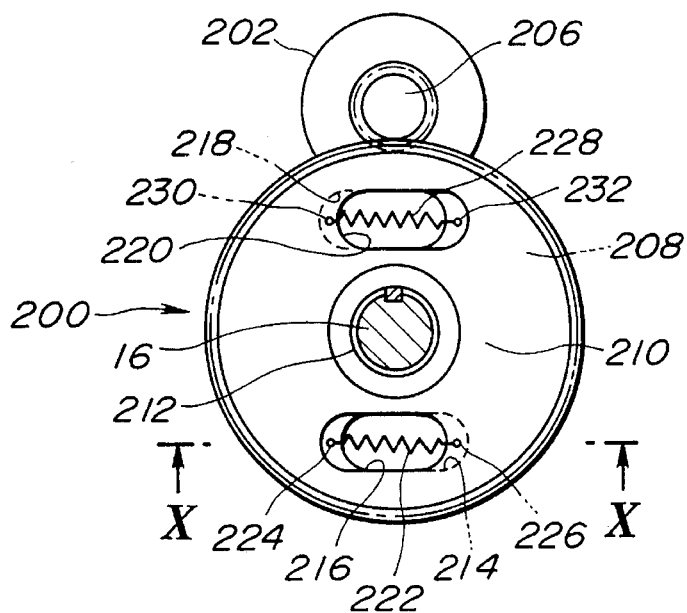
FIG. 9 is a view taken along an arrow IX in FIG. 8.

FIGS. 8 and 9 show a second embodiment. This embodiment is substantially the same as the first embodiment except the manner of driving the control rod 16.

In this second embodiment, a gear generally denoted by the reference numeral 200 is coupled with a control rod 16 for rotation therewith. An electric motor 202 has an output shaft 204 fixedly coupled with a pinion 206. The electric motor 202 is mounted so that the pinion 206 is kept in mesh with the teeth of the gear 200. The electric motor 202 operates in response to the output signal of a control unit 168.

The gear 200 is axially divided into and includes a first gear part 208 mounted on the control rod for rotation therewith and a second gear part 210. The first gear part 208 has a hub portion on which the second gear part 210 is supported. Movement of the second gear part 210 in an axial direction away from the first gear part 208 is restricted by a snap ring 212. This structure allows a limited angular movement of the second gear part 210 relative to the first gear part 208.

Figure 10:
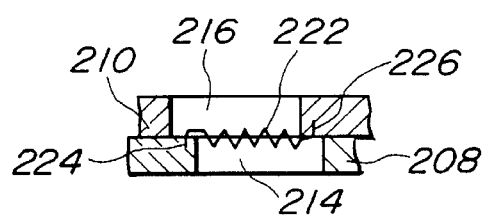
FIG. 10 is a section taken through the line X—X in FIG. 9.

As shown in FIG. 9, the first and second gear parts 208 and 210 have a plurality, two in this example, pairs of windows, namely a first pair of windows 214 and 216, a second pair of windows 218 and 220. A tension coil spring 222 is disposed in the first pair of windows 218 and 220. As best seen in FIG. 10, the spring 222 has a lefthand end 224, viewing in FIG. 9, anchored to the first gear part 208 at a portion adjacent the lefthand side, viewing in FIG. 9, of the window 214. It has a righthand end 226, viewing in FIG. 9, anchored to the second gear part 210 at a portion adjacent the righthand side, viewing in FIG. 9, of the window 216. The other pair of windows 218 and 220 are angularly spaced at an angle of 180° in this embodiment. Similarly to the spring 222, a tension coil spring 228, disposed in the second pair of windows 218 and 220, has a righthand end 232, viewing in FIG. 9, anchored to the first gear part 208 at a portion adjacent the righthand side of the window 218 and a lefthand end 230 anchored to the second gear part 210 at a portion adjacent the lefthand side of the window 220. These springs 222 and 220 are tensioned to resiliently hold the second gear part 210 angularly displaced relative to the first gear part 208. With this spring arrangement, the teeth of the second gear part 210 are angularly displaced from the mating teeth of the first gear part 208 so that one tooth disposed in space between the adjacent two teeth of the pinion 206 and the mating tooth disposed in the same space are kept in contact with the adjacent two teeth of the pinion 206, respectively. This is effective in suppressing noise or wear induced owing to backlash.

What is claimed is:

1. A device for moving a cam relative to its driving shaft, the device comprising:

a driving shaft rotatable about a shaft axis;

a hollow cam rotatable, about said shaft axis, relative to said driving shaft;

a support;

an intermediate member supported in said support for rotation so as to rotate eccentrically with respect to said shaft axis;

a drive collar mounted coaxially with said driving shaft for rotation therewith and having a first radial slot;

a driven collar rotatable with said hollow cam and having a second radial slot;

a first pin having one end rotatably supported by said intermediate member and an other end slidably engaged in said first radial slot;

a second pin having one end rotatably supported by said intermediate member and an other end slidably engaged in said second radial slot;

means for holding said support for movement within a plane perpendicular to said shaft axis; and means for driving said support to take different positions continuously to produce different values in the eccentricity of said intermediate member, said driving means including a control rod rotatable about a control rod axis and means for converting an angular position which said control rod is positioned to one of said different positions which said support takes.

2. A device as claimed in claim 1, wherein said control rod has a pinion engaged by a rack and wherein hydraulic means controls the relative position of said rack in response to a linear actuator.

3. A device as claimed in claim 2, wherein said hydraulic means includes a piston rod with a piston slidably received in a piston bore of a slider supporting said rack, a spool movable under the control of said linear actuator and received in a spool bore of said slider, and wherein said spool and said spool bore of said slider cooperate with each other to form valve means for allowing supply of fluid to one side of said piston and discharge of fluid from the opposite side of said piston until said slider assumes a predetermined positional relationship with said spool after said spool has been displaced to break said predetermined positional relationship.

4. A device as claimed in claim 3, wherein said valve means includes said spool bore, a first outlet port opening to said spool bore and communicating with said piston bore on said one side of said piston, a second outlet port opening to said spool bore and communicating with said piston bore on said opposite side of said piston, an inlet port opening to said spool bore and communicating with a first groove, a first discharge port opening to said spool bore and communicating with a second groove, and a second discharge port opening to said valve bore and communicating with a third groove.

5. A device as claimed in claim 4, wherein said spool includes a land covering said inlet port, a land cooperating with said spool bore to define a clearance which allows passage of fluid from said first outlet port to said first discharge port, and a land cooperating with said spool bore to define a clearance which allows passage of fluid from said second outlet port to said second discharge port.

6. A device as claimed in claim 1, wherein said driving means includes a gear coupled with said control rod for rotation therewith, an electric motor, and a pinion fixedly coupled with said electric motor and in mesh with said gear.

7. A device as claimed in claim 6, wherein said gear is axially divided into and includes a first gear part rotatable with said control rod and a second gear part, said first and second gear parts having a plurality of pairs of windows, said gear including a plurality, corresponding in number to said plurality of pairs of windows, of springs disposed in said plurality of pairs of windows, respectively, said springs interconnecting said first and second gear parts so as to resiliently hold said second gear part in an angularly displaced position relative to said first gear part.

8. A device as claimed in claim 1, wherein said driving means includes a gear coupled with said control rod for rotation therewith, an actuator, and a pinion fixedly coupled with said actuator and in mesh with said gear.

9. A device as claim in claim 8, wherein said actuator is an electric motor.

10. A device as claimed in claim 8, wherein said gear is axially divided into and includes a first gear part rotatable with said control rod and a second gear part, said first and second gear parts having a plurality of pairs of windows, said gear including a plurality, corresponding in number to said plurality of pairs of windows, of springs disposed in said plurality of pairs of windows, respectively, said springs interconnecting said first and second gear parts so as to resiliently hold said second gear part in an angularly displaced position relative to said first gear part.

11. A device as claimed in claim 1, wherein said intermediate member is an annular disc fitted in said support and situated around said driving shaft.

12. A device as claimed in claim 1, wherein said second pin is symmetric to said first pin along said shaft axis and is disposed at an 180° angle with respect to said first pin.

13. A device as claimed in claim 12, wherein said varying speed of said hollow cam is regulated in amplitude and phase by adjusting a magnitude and angular displacement of the eccentricity of said intermediate member by moving said intermediate member relative to said driving shaft.

14. A device as claimed in claim 1, wherein said first pin causes said hollow cam to rotate at a same angular velocity as said driving shaft, and when said driving shaft and said drive collar rotate at the same angular velocity, said intermediate member accelerates or decelerates based upon the eccentricity of said intermediate member, and wherein said hollow cam rotates at a varying speed while said driving shaft rotates at a constant speed due to the eccentricity of said intermediate member.

* * * * *